US009823889B2

(12) United States Patent
Krutsch et al.

(10) Patent No.: US 9,823,889 B2
(45) Date of Patent: Nov. 21, 2017

(54) METHOD AND APPARATUS FOR ESTIMATING A FRAGMENT COUNT FOR THE DISPLAY OF AT LEAST ONE THREE-DIMENSIONAL OBJECT

(71) Applicant: Freescale Semiconductor, Inc., Austin, TX (US)

(72) Inventors: Robert Krutsch, Munich (DE); Laurent Emmerich, Munich (DE)

(73) Assignee: NXP USA, Inc., Austin, TX (US)

(\*) Notice: Subject to any disclaimer, the term of this patent is extended or adjusted under 35 U.S.C. 154(b) by 0 days.

(21) Appl. No.: 14/648,713

(22) PCT Filed: Jan. 8, 2013

(86) PCT No.: PCT/IB2013/050143
§ 371 (c)(1),
(2) Date: Jun. 1, 2015

(87) PCT Pub. No.: WO2014/108733
PCT Pub. Date: Jul. 17, 2014

(65) Prior Publication Data
US 2015/0317119 A1 Nov. 5, 2015

(51) Int. Cl.
*G06T 15/20* (2011.01)
*G06F 3/14* (2006.01)
*G06F 3/147* (2006.01)
*B60K 37/02* (2006.01)
*G06T 15/00* (2011.01)

(52) U.S. Cl.
CPC ............ *G06F 3/1431* (2013.01); *B60K 37/02* (2013.01); *G06F 3/147* (2013.01); *G06T 15/005* (2013.01); *G06T 15/20* (2013.01); *G06T 2215/16* (2013.01)

(58) Field of Classification Search
USPC ........................................... 345/419
See application file for complete search history.

(56) References Cited

U.S. PATENT DOCUMENTS

| 5,864,342 | A | 1/1999 | Kajiya et al. |
| 5,875,295 | A | 2/1999 | Devic |
| 6,191,795 | B1 * | 2/2001 | Liepa ............ G06T 15/04 345/585 |
| 6,516,093 | B1 | 2/2003 | Pardas et al. |

(Continued)

FOREIGN PATENT DOCUMENTS

WO       2009145916 A1    12/2009

OTHER PUBLICATIONS

"A Software-Based Self Test of CUDA Fermi GPUs" by Stefano Di Carlo et al., 18th IEEE European Test Symposium (ETS), 2013, IEEE 978-1-4673-6377-8/13.

(Continued)

*Primary Examiner* — Kimbinh T Nguyen

(57) ABSTRACT

A method of estimating a fragment count for the display of at least one three-dimensional (3D) object. The method comprises determining an ellipsoid representative of a set of vertices defined by coordinates of the at least one 3D object, applying a transformation to the ellipsoid, calculating a projection area of the transformed ellipsoid, and estimating the fragment count for the display of the 3D object based at least partly on the calculated projection area of the transformed ellipsoid.

20 Claims, 3 Drawing Sheets

(56) References Cited

U.S. PATENT DOCUMENTS

| | | | |
|---|---|---|---|
| 6,664,975 B1* | 12/2003 | Hatch | G06F 17/10 |
| | | | 345/622 |
| 7,643,033 B2 | 1/2010 | Sekine et al. | |
| 7,777,750 B1 | 8/2010 | Brown et al. | |
| 7,986,325 B1 | 7/2011 | Gold et al. | |
| 8,477,149 B2* | 7/2013 | Beato | G06K 9/4652 |
| | | | 345/592 |
| 8,896,605 B2* | 11/2014 | Hao | G06T 11/203 |
| | | | 345/440 |
| 8,933,934 B1 | 1/2015 | Hill et al. | |
| 2001/0027381 A1 | 10/2001 | Kikuchi et al. | |
| 2002/0131640 A1 | 9/2002 | Wilt | |
| 2005/0143654 A1 | 6/2005 | Zuiderveld et al. | |
| 2005/0151839 A1 | 7/2005 | Ito et al. | |
| 2005/0231504 A1 | 10/2005 | Heng et al. | |
| 2007/0014446 A1* | 1/2007 | Sumanaweera | G06T 15/08 |
| | | | 382/128 |
| 2007/0200864 A1 | 8/2007 | Tucker | |
| 2008/0095237 A1 | 4/2008 | Hussain et al. | |
| 2009/0070079 A1 | 3/2009 | Harada | |
| 2009/0128570 A1 | 5/2009 | Chen | |
| 2009/0189888 A1 | 7/2009 | Dollner | |
| 2010/0045636 A1 | 2/2010 | Noguchi et al. | |
| 2010/0138376 A1 | 6/2010 | Avis et al. | |
| 2010/0188404 A1 | 7/2010 | Tong et al. | |
| 2010/0275224 A1 | 10/2010 | Sheng et al. | |
| 2011/0063452 A1 | 3/2011 | Fifis et al. | |
| 2011/0115806 A1 | 5/2011 | Rogers | |
| 2012/0206572 A1 | 8/2012 | Russell | |
| 2013/0063460 A1 | 3/2013 | Marison et al. | |
| 2013/0106880 A1 | 5/2013 | Williams | |
| 2014/0146062 A1 | 5/2014 | Kiel et al. | |
| 2014/0267343 A1 | 9/2014 | Arcas et al. | |
| 2016/0148335 A1 | 5/2016 | Huang et al. | |

OTHER PUBLICATIONS

"Argus-G: A Low-Cost Error Detection Scheme for GPGPUs" by Ralph Nathan and Daniel J. Sorin, WRA '10, Dec. 4-8, 2010, Atlanta, Georgia, U.S.A, ACM 1-58113-000-0/00/0010.

"A Hardware Redundancy and Recovery Mechanism for Reliable Scientific Computation on Graphics Processors", Jeremy W. Sheaffer et al., Graphics Hardware (GH), 2007, ACM 978-1-59593-625-710710008.

"The Visual Vulnerability Spectrum: Characterizing Architectural Vulnerability for Graphics Hardware" by Jeremy W. Sheaffer et al., Graphics Hardware (GH), 2006, The Eurographics Association.

"Vulnerability analysis of GPU computing" by Michael Patterson, PhD Thesis, 2013, Iowa State University; in particular pp. 21-33.

"CASP: concurrent autonomous chip self-test using stored test patterns" by Yanjing Li et al., Design, Automation and Test in Europe, 2008, Date '08, pp. 885-890, IEEE 978-3-9810801-3-1.

"On Testing GPU Memory for Hard and Soft Errors" by Guochun Shi et al., Symposium on Application Accelerators in High-Performance Computing (SAAHPC'09) at National Center for Supercomputing Applications, University of Illinois at Urbana-Champaign, Jul. 28-30, 2009.

"Verifying GPU kernels by test amplification" by Alan Leung et al., Programming Language Design and Implementation PLDI'12, Jun. 11-16, 2012, Beijing, China, ACM 978-1-4503-1205-9/12/06.

"Warped-DMR: Light-weight Error Detection for GPGPU" by Hyeran Jeon and Murali Annavaram, IEEE/ACM 45th Annual International Symposium on Microarchitecture, 2012, pp. 37-47.

"Understanding software approaches for GPGPU reliability" by Martin Dimitrov et al., GPGPU'09 Mar. 8, 2009, Washington, DC, USA, ACM 978-1-60558-517-8/09/03.

International Search Report and Written Opinion correlating to PCT/IB2013/050143 dated Oct. 24, 2013.

Shinpei Kato, Karthik Lakshmanan, Ragunathan Rajkumar; "TimeGraph: GPU Scheduling for Real-Time Multi-tasking Environments"; Proceedings of the 2011 USENIX conference on USENIX annual technical conference.

"Graphic Engine Resource Management," by Mikhail Bautin, Ashok Dearakinath, Tzi-Cker Chiuch; Stony Brook University Computer Science Department; Proceedings of SPIE—The International Society for Optical Engineering; Jan. 2008;12 pages.

Non-Final Office Action for U.S. Appl. No. 14/746,980, dated Sep. 29, 2016, 23 pages.

Non-Final Office Action for U.S. Appl. No. 14/747,003, dated Sep. 29, 2016, 31 pages.

Non-Final Office Action for U.S. Appl. No. 14/746,948, dated Oct. 3, 2016, 30 pages.

Final office action dated Apr. 20, 2017 in U.S. Appl. No. 14/746,948.

Final office action dated Apr. 21, 2017 in U.S. Appl. No. 14/747,003.

Final office action dated May 1, 2017 in U.S. Appl. No. 14/746,980.

Final office action dated May 4, 2017 in U.S. Appl. No. 14/747,023.

Non-Final Office Action for U.S. Appl. No. 14/747,023, dated Nov. 3, 2016, 35 pages.

Notice of Allowance dated Aug. 9, 2017 for U.S. Appl. No. 14/746,950, 13 pages.

Non-Final Office Action dated Sep. 29, 2016 for U.S. Appl. No. 14/747,003, 22 pages.

Non-Final Office Action dated Sep. 19, 2017 for U.S. Appl. No. 14/747,023, 40 pages.

* cited by examiner

METHOD AND APPARATUS FOR ESTIMATING A FRAGMENT COUNT FOR THE DISPLAY OF AT LEAST ONE THREE-DIMENSIONAL OBJECT

FIELD OF THE INVENTION

This invention relates to a method and apparatus for estimating a fragment count for the display of at least one three-dimensional object.

BACKGROUND OF THE INVENTION

In the field of automotive driver information display systems, a user (e.g. driver) is provided with large amounts of different information, for example ranging from vehicle/engine information provided by way of an instrument cluster, navigation information provided by way of a navigation system, media and entertainment (infotainment) related information provided by way of an infotainment system, etc. Conventionally, the various different types of information are provided by way of separate graphics processing units (GPUs) and multiple displays. In order to reduce costs, complexity, etc., there is a desire for the various information display systems to share a single GPU in near future automotive systems, whereby a single GPU is used to provide the various different types of information to the user via one or more displays.

An instrument cluster provides critical, time-sensitive information to a driver of a vehicle, such as the speed of the vehicle etc. Accordingly, the instrument cluster is a critical module and the timely display of information thereby is also critical. The instrument cluster therefore needs to have access to the GPU in a timely manner, and with a certain level of determinism. In order to be able to guarantee the number of frames per second required by the instrument cluster module when using a shared GPU, whilst optimising overall throughput of the GPU, one has to estimate the required run time duration of other modules accessing the shared GPU.

In future systems, it is contemplated that users may be able to download additional software applications (for example as part of an infotainment module functionality), complicating the task of estimating the required run time duration of non-instrument cluster modules accessing the shared GPU.

SUMMARY OF THE INVENTION

The present invention provides a method of estimating a fragment count for a display of at least one three-dimensional (3D) object, a method of calculating a runtime duration estimate for at least a part of a command sequence for a graphics processing unit (GPU), a signal processing component arranged to estimate a fragment count for a display of at least one 3D object, an information display system comprising at least one such signal processing component, and a non-transitory computer program product having executable program code stored therein for estimating a fragment count for a display of at least one 3D object as described in the accompanying claims.

Specific embodiments of the invention are set forth in the dependent claims.

These and other aspects of the invention will be apparent from and elucidated with reference to the embodiments described hereinafter.

BRIEF DESCRIPTION OF THE DRAWINGS

Further details, aspects and embodiments of the invention will be described, by way of example only, with reference to the drawings. In the drawings, like reference numbers are used to identify like or functionally similar elements. Elements in the figures are illustrated for simplicity and clarity and have not necessarily been drawn to scale.

DETAILED DESCRIPTION OF THE PREFERRED EMBODIMENTS

Figure 1:
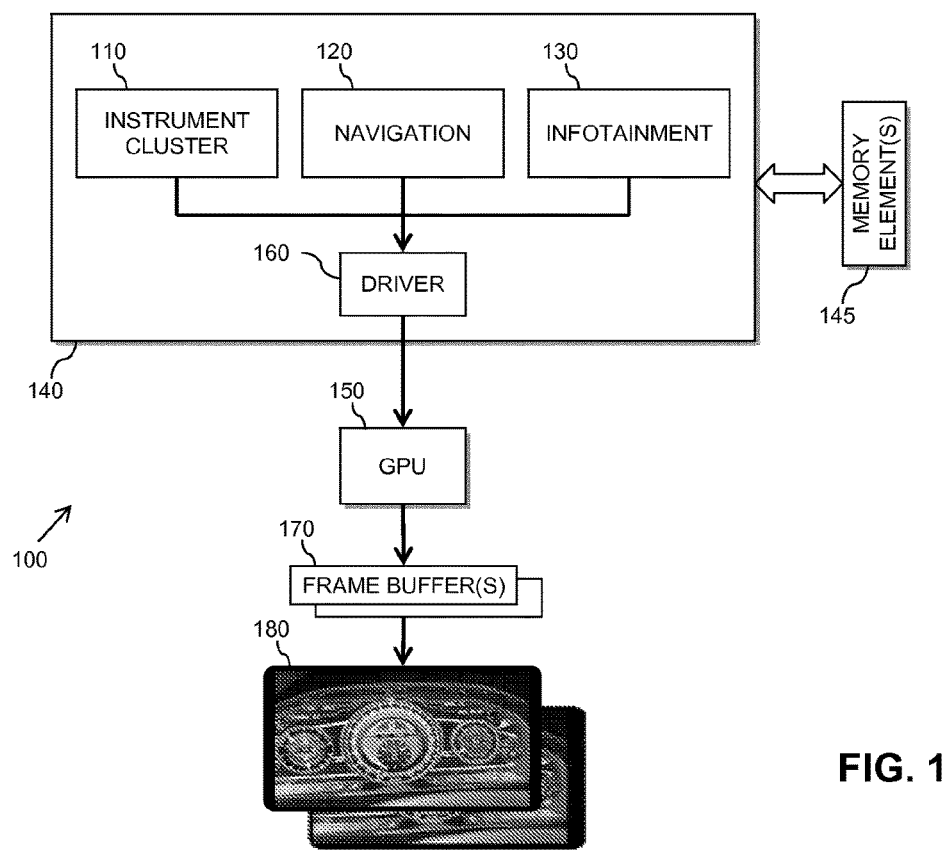
FIG. 1 illustrates a simplified block diagram of an example of an information display system.

The present invention will now be described with reference to the accompanying drawings, and in particular is described with reference to a method and apparatus for estimating a fragment count for a display of at least one three-dimensional object within an automotive driver information display system. However, it will be appreciated that the present invention is not limited to the specific examples herein described. For example, it is contemplated that the present invention may equally be implemented in display systems other than automotive driver information display systems in which a graphics processing unit is arranged to display information from multiple applications.

Furthermore, because the illustrated embodiments of the present invention may for the most part, be implemented using electronic components and circuits known to those skilled in the art, details will not be explained in any greater extent than that considered necessary as illustrated below, for the understanding and appreciation of the underlying concepts of the present invention and in order not to obfuscate or distract from the teachings of the present invention.

According to some examples of the present invention, there is provided a signal processing module, such as an application processing core executing one or more graphics processing unit driver components, arranged to perform a method of estimating a fragment count for a display of at least one three-dimensional (3D) object. The method comprises determining an ellipsoid representative of a set of vertices defined by coordinates of the at least one 3D object, applying a transformation to the ellipsoid, calculating a projection area of the transformed ellipsoid, and estimating the fragment count for the display of the 3D object based at least partly on the calculated projection area of the transformed ellipsoid.

Advantageously, by using an ellipsoid representative of the set of vertices in this manner, application of the transformation to the ellipsoid is easily implementable, and the projection area of the transformed ellipsoid may easily be determined. In particular, the example method herein described with reference to the accompanying drawings enables runtime durations for command sequences provided to, say, a shared GPU to be estimated with relative accuracy, without the need for executing all the transformation steps for all vertices (a prohibitively processor-intensive exercise). Consequently, the example method herein described with reference to the accompanying drawings enables improved predictive GPU scheduling, improved worst case execution time prediction, and improved load balancing.

In some examples, the ellipsoid representative of a set of vertices defined by coordinates of the at least one 3D object may comprise at least one of an inertia ellipsoid, a best-fit ellipsoid, and a bounding ellipsoid.

In some examples, the method may comprise determining a sphere representative of the set of vertices.

In some examples, the fragment count for the display of the 3D object may be estimated based at least partly on the projection area of the transformed ellipsoid multiplied by a coefficient value. For example, the coefficient value may comprise a predefined coefficient value. Alternatively, the coefficient value may comprise a value derived at least partly from at least one of measured fragment count data and previous fragment count estimate data for at least one previously displayed object.

According to a further aspect of the invention, the signal processing module may be arranged to perform a method of calculating a runtime duration estimate for at least a part of a command sequence for a graphics processing unit (GPU), the method comprising estimating a fragment count for a display of at least one 3D object as outlined above.

Referring now to FIG. 1, there is illustrated a simplified block diagram of an example of an information display system 100, such as may be implemented within an automotive driver information display system, for providing a user (e.g. driver) with information such as vehicle/engine information provided by way of an instrument cluster application, navigation information provided by way of a navigation system application, media and entertainment (infotainment) related information provided by way of an infotainment system application, etc. In the example illustrated in FIG. 1, the various information display applications are arranged to be merged into a single display unit, whereby a single graphics processing unit (GPU) 150 is used to display the various different types of information to the user. Accordingly, the information display system 100 illustrated in FIG. 1 comprises an instrument cluster application 110, a navigation system application 120 and an infotainment system application 130 arranged to be executed on one or more application processing cores illustrated generally at 140. The application processing core(s) 140 comprise(s) a GPU driver component 160 arranged to receive display commands from the applications 110, 120, 130, and to output corresponding command sequences to the GPU 150, which executes the received command sequences and updates one or more frame buffer(s) 170 comprising, for example, pixel data to be displayed. One or more display module(s) 180 is/are arranged to read the contents of the frame buffer(s) 170 and to display the pixel information contained within the frame buffer(s) 170.

For completeness, the application processing core(s) may be arranged to execute computer program code stored within one or more memory element(s), such as memory element 145. The memory element(s) 145 may comprise any form of non-transitory computer program product, such as a hard disk, a CD-ROM, an optical storage device, a magnetic storage device, a Read Only Memory (ROM), a Programmable Read Only Memory (PROM), an Erasable Programmable Read Only Memory (EPROM), an Electrically Erasable Programmable Read Only Memory (EEPROM), and a Flash memory.

When an application (e.g. the instrument cluster application 110, navigation system application 120 or infotainment system application 130) wants to display information to a user, or update/modify information displayed to a user, the application 110, 120, 130 sends commands to the GPU driver component 160 comprising data about the information to be displayed. The GPU driver component 160 processes the received commands from the application 110, 120, 130, and generates a hardware (GPU) specific command sequence which is then sent to the GPU 150. The GPU 150 executes the command sequence generated by the GPU driver component 160, and updates the frame buffer(s) 170 accordingly.

In modern automotive systems, information is typically displayed using three-dimensional (3D) graphics. 3D objects representing the information to be displayed are initially described by way of sets of vertices that may be assembled into geometric shapes, or 'primitives', such as triangles, lines, point-sprites, etc. within a 3D space. As such, in the example illustrated in FIG. 1, the GPU driver component 160 may be arranged to generate command sequences within which 3D objects representing the information to be displayed are defined by way of such sets of vertices etc. The GPU 150 may then execute the command sequences, assembling the vertices into their respective primitives, and perform rasterization—the process of converting the geometric primitives into a set of two-dimensional (2D) fragments. The resulting 2D fragments represent pixels that can subsequently be 'drawn' on the display module 180.

The first stage of assembling the vertices into their respective primitives typically comprises transformation of the vertices, which is usually performed by way of matrix multiplication. Transformation typically involves translation (the movement of points from its original location to another location relative to a display origin by a constant offset, which has the effect of 'locating' the object to be displayed relative to the display screen origin), scaling, and rotation. The effect of the transformation is to render the 3D primitives into their 2D locations and orientations.

After transformation has been performed, clipping is performed whereby the transformed primitives are 'clipped' to fit within the viewing area of the display. For example, one common technique is the Sutherland-Hodgeman clipping algorithm in which each of the four edges of the viewing window is 'tested' at a time. For each edge, all primitives are tested, and if determined to be outside of the edge they are removed. If an edge of a primitive is intersected by the edge of the viewing window, a point is inserted at the intersection, and the 'outside' part of the primitive is removed.

The stage of rasterization comprises filling and shading the 2D renderings of the primitives, which is often referred to as scan conversion. The first problem to consider is whether or not to draw a pixel at all. For a pixel to be rendered, it must be within a primitive, and it must not be occluded, or blocked by another pixel. Since it is difficult to know that the rasterization engine will draw all pixels from front to back, there must be some way of ensuring that pixels close to the viewer are not overwritten by pixels far away. A z buffer is the most common solution. The z buffer is a 2D array corresponding to the image plane which stores a depth value for each pixel. Whenever a pixel is drawn, it updates the z buffer with its depth value. Any new pixel must check its depth value against the z buffer value before it is drawn. Closer pixels are drawn and farther pixels are disregarded.

To find out a pixel's colour, textures and shading calculations must be applied. For example, a texture map is a bitmap that may be applied to a primitive to define its look. Each primitive vertex may also be associated with a texture and a texture coordinate (u,v) for normal 2D textures in addition to its position coordinate. Every time a pixel on a primitive is rendered, the corresponding texel (or texture element) in the texture may be found. This is done by interpolating between the primitive's vertices' associated texture coordinates by the pixels on-screen distance from the vertices. In perspective projections, interpolation is typically performed on the texture coordinates divided by the depth of the vertex to avoid a problem known as perspective foreshortening (a process known as perspective texturing). Before the final colour of the pixel can be decided, a lighting calculation may be performed to shade the pixels based on any lights which may be present in the scene.

The instrument cluster application 110 provides critical, time-sensitive information to a user. Accordingly, the instrument cluster application 110 is a critical module and the timely display of information thereby is also critical. The instrument cluster application 110 therefore needs to have access to the GPU 150 in a timely manner, and with a certain level of determinism. In order to be able to guarantee the number of frames per second required by the instrument cluster application 110 when using the shared GPU 150, whilst optimising overall throughput of the GPU 150, one has to estimate the required run time duration of command sequences for other modules accessing the shared GPU 150, such as the navigation system application 120 and infotainment system application 130.

Estimating the runtime duration for each command sequence provided to the GPU 150 can be done by taking into account various factors such as:
(i) the number of vertices to be assembled;
(ii) the number of transformation steps required for each vertex;
(iii) the number of fragments to be displayed; and
(iv) the length of the filling and shading stage of the rasterization process.

The number of vertices to be assembled and the number of transformation steps required for each vertex may easily be estimated, for example substantially directly from the information within the command sequence generated by the GPU driver component 160. However, taking into account only the vertex count and/or the number of transformation steps required therefor can lead to significant over or under estimation of the runtime duration required for the GPU 150 to process a command sequence for displaying an object. In order to more accurately estimate the runtime duration of a command sequence for displaying an object, it is necessary to determine the number of fragments to be displayed. Estimating the number of fragments to be displayed without executing all the transformation steps for all vertices (a prohibitively processor-intensive exercise) is the biggest difficulty in estimating the runtime duration for a command sequence.

Figure 2:
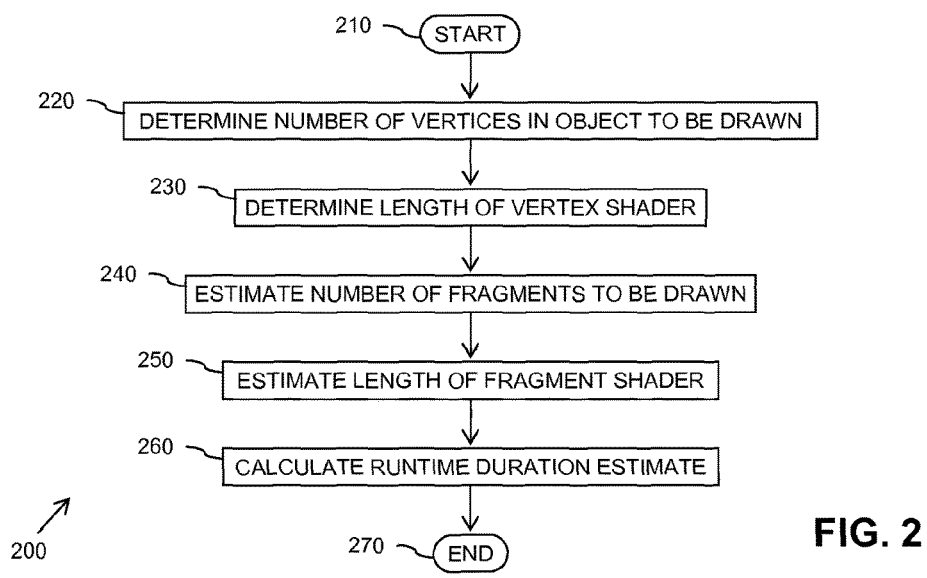
FIG. 2 illustrates a simplified flowchart of an example of a method of calculating a runtime duration estimate for at least a part of a command sequence for a graphics processing unit.

FIG. 2 illustrates a simplified flowchart 200 of an example of a method of calculating a runtime duration estimate for at least a part of a command sequence for a GPU, such as the GPU 150 illustrated in FIG. 1. In some example embodiments, the method of FIG. 2 may be implemented by way of computer program code arranged to be executed by one or more signal processing modules, such as the application processing core(s) 140 illustrated in FIG. 1. For example, the method illustrated in FIG. 2 may be performed by the GPU driver component 160 in the example illustrated in FIG. 1. Alternatively, in some further examples the method illustrated in FIG. 2 may be performed by way of computer program code being executed by signal processing functionality of the GPU 150 itself.

The method starts at 210, and moves on to 220 wherein, in the illustrated example, a number of vertices defined by object coordinates of the 3D object(s) to be drawn is determined. Next, at 230, a number of transformation steps required for the vertices (vertex shader length) is determined. The number of vertices and the number of transformation steps may be determined substantially directly from, say, commands sent to the GPU driver component 160 comprising data about the 3D object to be displayed. The method illustrated in FIG. 2 further comprises, at 240, estimating a number of fragments (fragment count) to be drawn for displaying the 3D object(s), as described in greater detail below with reference to FIG. 3. Having estimated the number of fragments to be drawn, the method moves on to 250, where the length of the filling and shading stage of the rasterization process (fragment shader length) required for the display of the 3D object(s) is then estimated. For example, one may analyse the assembly code for performing the filling and shading of fragments (e.g. get the number of instructions, consider the delay of the instructions and add up the cycles). The code will be executed a number of times dependent on the number of inputs (e.g. fragments etc.). Estimating the code may additionally/alternatively comprise considering a hardware model (usually a simplified model).

Finally, at 260, the runtime duration for the GPU to execute a command sequence to display the 3D objects is calculated based on the determined number of vertices and transformations therefor, the estimated and fragment count and the estimated fragment shader length. The method then ends, at 270.

Figure 3:
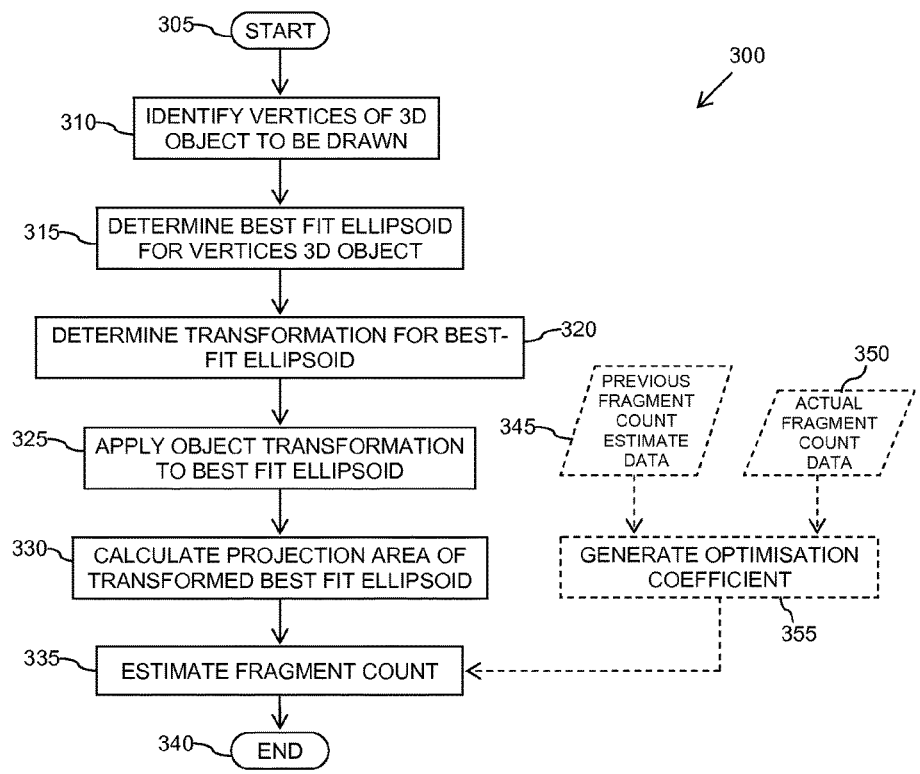
FIG. 3 illustrates a simplified flowchart of an example of a method of estimating a fragment count for a display of at least one three-dimensional object.

Referring now to FIG. 3, there is illustrated a simplified flowchart 300 of an example of a method of estimating a fragment count for a display of at least one 3D object, such as may be implemented at 240 in the method of FIG. 2. The method of FIG. 3 starts at 305 and moves on to 310 where a set of vertices defined by coordinates of the 3D object(s) are identified. For example, the set of vertices may be substantially directly derivable from, say, display commands received from the applications 110, 120, 130 in FIG. 1. Next, at 315, an ellipsoid representative of the set of vertices is determined. For example, a generic form of a 3D ellipsoid may be defined expressed as:

$$(X-v)^T A^{-1}(X-v)=1 \qquad \text{[Equation 1]}$$

where v is the centre of the ellipsoid and A is a positive defined matrix, and X is a generic 3D point of the form:

$$X = \begin{pmatrix} x \\ y \\ z \end{pmatrix}.$$

A ellipsoid representative of the set of vertices may be found based on various known methods. For example, one computationally simple method for finding an ellipsoid representative of the set of vertices may be based on finding an inertia ellipsoid for the set of vertices (a construction typically found in mechanics). Taking the vertex set:

$$\bar{x}_i = \begin{pmatrix} x_i \\ y_i \\ z_i \end{pmatrix} \qquad \text{[Equation 2]}$$

an inertia ellipsoid (with its centre at the origin) may be found by:

$$I_{xx}x^2 + I_{yy}y^2 I_{zz}z^2 + 2I_{xy}xy + 2I_{xz}xz + 2I_{yz}yz = 1 \quad [\text{Equation 3}]$$

where $I_{xx}$, $I_{yy}$ and $I_{zz}$ each represent a moment of inertia corresponding to a respective Cartesian axis, and are defined by:

$$I_{xx} = \Sigma_i(z_i^2 + y_i^2) \quad [\text{Equation 4}]$$

$$I_{yy} = \Sigma_i(z_i^2 + x_i^2) \quad [\text{Equation 5}]$$

$$I_{zz} = \Sigma_i(x_i^2 + y_i^2) \quad [\text{Equation 6}]$$

whilst $I_{yz}$, $I_{zx}$ and $I_{xy}$ each represent a product of inertia, and are defined by:

$$I_{yz} = \Sigma_i z_i y_i \quad [\text{Equation 7}]$$

$$I_{zx} = \Sigma_i z_i x_i \quad [\text{Equation 8}]$$

$$I_{xy} = \Sigma_i x_i y_i \quad [\text{Equation 9}]$$

Equation 1 and Equation 2 above are essentially equivalent: one is the matrix form and one is the, say, polynomial form. Equation 2 is simplified, considering the ellipsoid centre is located at the centre of the coordinate system. By computing the products of inertia one can find out the equation of the ellipsoid and the centre of the ellipsoid. The computation is a simple product summation over the vertices set. The use of an inertia ellipsoid in this manner has the benefit that it is computationally simple to obtain, and provides a fast, reasonable representation for the set of vertices that provides good results.

In some alternative examples, a more accurate but more computationally complex method for finding an ellipsoid representative of the set of vertices may be implemented comprising a best-fit ellipsoid, such as a method comprising finding a least squares fitting ellipsoid for the set of vertices. One such least squares method is described in "Multi-dimensional Ellipsoidal Fitting", written by Bridget Bertoni from the Departments of Physics of Southern Methodist University and the University of Washington, Seattle, data Aug. 10, 2010, incorporated herein by reference. Accordingly, in some examples a best-fit ellipsoid may be found that comprises, say, a best geometric fit (as opposed to a best algebraic fit).

In some examples. an ellipsoid in the form of a sphere may be found, thereby simplifying the subsequent process of applying a transformation for the 3D object to the ellipsoid (as described in greater detail below) due to the rotation invariance of a sphere.

It will be appreciated that the present invention is not limited to finding an inertia ellipsoid or a best-fit ellipsoid for the set of vertices, and may equally comprise finding any alternative ellipsoid representative of the set of vertices. One such alternative ellipsoid may comprise a bounding ellipsoid etc.

Referring back to FIG. 3, in the illustrated example a best-fit ellipsoid is determined at 315. Having determined the ellipsoid representative of the set of vertices, the method moves on to 320, where a transformation for the 3D object is determined. For example, for each transformation stage (e.g. translation, rotation, scaling, etc.) for a 3D object comprises a matrix multiplication. Accordingly, such a transformation for the 3D object may be simply determined based on the matrices to be used for such matrix multiplication.

The determined transformation is then applied to the ellipsoid, at 325, for example by way of a set of matrix multiplications (one per transformation stage). For example, a matrix multiplication may be applied to the matrix representation of the ellipsoid for one or more of a translation transformation, a rotation transformation and/or a scaling transformation. Next, at 330, a projection area of the transformed ellipsoid is calculated. The projection area for the transformed ellipsoid may be calculated using any suitable technique. For example, considering a resolution of 240 by 240 pixels and for simplicity reason a projection that is a circle of radius 100 pixels, the area in pixels may be calculated as pi*100*100=31416 pixels. In case of an ellipsoid with semi major axis of 100 pixels and semi minor axis of 50 pixels the area will be pi*100*50=15708 (same resolution considered). An example of a more comprehensive technique is described in "Perspective Projection of an Ellipsoid", a document written by David Eberly of Geometric Tools LLC, and available from http://www.geometrictools.com.

Having calculated the projection area of the ellipsoid, a fragment count for the display of the 3D object(s) is then estimated based on the projected area of the transformed ellipsoid, for example by multiplying the projection area of the transformed ellipsoid by a coefficient value 355. The method then ends at 340.

Advantageously, by using a ellipsoid in this manner, application of the transformation to the ellipsoid is easily implementable, and the projection area of the transformed ellipsoid may easily be determined. The most significant processing overhead of the illustrated example is determining the ellipsoid. An efficient implementation for determining the ellipsoid could be achieved using, for example, a NEON™ accelerator on an ARM™ processing core, or other similar hardware accelerator. Nevertheless, the example method herein described with reference to the accompanying drawings enables runtime durations for command sequences provided to, in the example illustrated in FIG. 1, the shared GPU 150 to be estimated with relative accuracy, without the need for executing all the transformation steps for all vertices (a prohibitively processor-intensive exercise). Consequently, the example method herein described with reference to the accompanying drawings enables improved predictive GPU scheduling, improved worst case execution time prediction, and improved load balancing.

In some examples, the fragment count may be estimated based at least partly on the projection area of the transformed ellipsoid multiplied by a predefined coefficient value 355. Conversely, in some alternative examples, the fragment count estimate may be further based on historic fragment count measurement data. For example, and as illustrated in FIG. 3, the coefficient value 355 may be derived at least partly from measured (actual) fragment count data 350 and/or previous fragment count estimate data 345 for at least one previously displayed object.

The invention may be implemented in a computer program for running on a computer system, at least including code portions for performing steps of a method according to the invention when run on a programmable apparatus, such as a computer system or enabling a programmable apparatus to perform functions of a device or system according to the invention.

A computer program is a list of instructions such as a particular application program and/or an operating system. The computer program may for instance include one or more of: a subroutine, a function, a procedure, an object method, an object implementation, an executable application, an applet, a servlet, a source code, an object code, a shared library/dynamic load library and/or other sequence of instructions designed for execution on a computer system.

The computer program may be stored internally on computer readable storage medium or transmitted to the computer system via a computer readable transmission medium. All or some of the computer program may be provided on computer readable media permanently, removably or remotely coupled to an information processing system. The computer readable media may include, for example and without limitation, any number of the following: magnetic storage media including disk and tape storage media; optical storage media such as compact disk media (e.g., CD-ROM, CD-R, etc.) and digital video disk storage media; nonvolatile memory storage media including semiconductor-based memory units such as FLASH memory, EEPROM, EPROM, ROM; ferromagnetic digital memories; MRAM; volatile storage media including registers, buffers or caches, main memory, RAM, etc.; and data transmission media including computer networks, point-to-point telecommunication equipment, and carrier wave transmission media, just to name a few.

A computer process typically includes an executing (running) program or portion of a program, current program values and state information, and the resources used by the operating system to manage the execution of the process. An operating system (OS) is the software that manages the sharing of the resources of a computer and provides programmers with an interface used to access those resources. An operating system processes system data and user input, and responds by allocating and managing tasks and internal system resources as a service to users and programs of the system.

The computer system may for instance include at least one processing unit, associated memory and a number of input/output (I/O) devices. When executing the computer program, the computer system processes information according to the computer program and produces resultant output information via I/O devices.

In the foregoing specification, the invention has been described with reference to specific examples of embodiments of the invention. It will, however, be evident that various modifications and changes may be made therein without departing from the broader spirit and scope of the invention as set forth in the appended claims.

The connections as discussed herein may be any type of connection suitable to transfer signals from or to the respective nodes, units or devices, for example via intermediate devices. Accordingly, unless implied or stated otherwise, the connections may for example be direct connections or indirect connections. The connections may be illustrated or described in reference to being a single connection, a plurality of connections, unidirectional connections, or bidirectional connections. However, different embodiments may vary the implementation of the connections. For example, separate unidirectional connections may be used rather than bidirectional connections and vice versa. Also, plurality of connections may be replaced with a single connection that transfers multiple signals serially or in a time multiplexed manner. Likewise, single connections carrying multiple signals may be separated out into various different connections carrying subsets of these signals. Therefore, many options exist for transferring signals.

Those skilled in the art will recognize that the boundaries between logic blocks are merely illustrative and that alternative embodiments may merge logic blocks or circuit elements or impose an alternate decomposition of functionality upon various logic blocks or circuit elements. Thus, it is to be understood that the architectures depicted herein are merely exemplary, and that in fact many other architectures can be implemented which achieve the same functionality.

Any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality.

Furthermore, those skilled in the art will recognize that boundaries between the above described operations merely illustrative. The multiple operations may be combined into a single operation, a single operation may be distributed in additional operations and operations may be executed at least partially overlapping in time. Moreover, alternative embodiments may include multiple instances of a particular operation, and the order of operations may be altered in various other embodiments.

Also for example, the examples, or portions thereof, may implemented as soft or code representations of physical circuitry or of logical representations convertible into physical circuitry, such as in a hardware description language of any appropriate type.

However, other modifications, variations and alternatives are also possible. The specifications and drawings are, accordingly, to be regarded in an illustrative rather than in a restrictive sense.

In the claims, any reference signs placed between parentheses shall not be construed as limiting the claim. The word 'comprising' does not exclude the presence of other elements or steps then those listed in a claim. Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements The mere fact that certain measures are recited in mutually different claims does not indicate that a combination of these measures cannot be used to advantage.

The invention claimed is:

1. A method of estimating a fragment count for a display of at least one three-dimensional, 3D, object; the method comprising:
   determining an ellipsoid representative of a set of vertices defined by coordinates of the at least one 3D object;
   applying a transformation to the ellipsoid;
   calculating, by a hardware processing component, a projection area of the transformed ellipsoid;
   estimating, by the hardware processing component, the fragment count for the display of the 3D object based at least partly on the calculated projection area of the transformed ellipsoid prior to a runtime display of the 3D object; and estimating by the hardware processing component, a time fragment shader length for the display of the 3D object based at least partly on the calculated projection area of the transformed ellipsoid prior to the runtime display of the 3D object, wherein estimating the time fragment shader length is performed after estimating the fragment count, wherein the time fragment shader length is a length of time to process instructions associated with a filling and shading stage.

2. The method of claim 1, wherein the ellipsoid representative of a set of vertices defined by coordinates of the at least one 3D object comprises at least one of:
an inertia ellipsoid;
a best-fit ellipsoid; and
a bounding ellipsoid.

3. The method of claim 1, wherein the method comprises determining a sphere representative of the set of vertices.

4. The method of claim 1, wherein the fragment count for the display of the 3D object is estimated based at least partly on the projection area of the transformed ellipsoid multiplied by a coefficient value.

5. The method of claim 4, wherein the coefficient value comprises a predefined coefficient value.

6. The method of claim 4, wherein the coefficient value comprises a value derived at least partly from at least one of measured fragment count data and previous fragment count estimate data for at least one previously displayed object.

7. The method of claim 1 further comprising: calculating a runtime duration estimate for at least a part of a command sequence for a graphics processing unit including estimating a fragment count for a display of the at least one three-dimensional, 3D, object.

8. A hardware processing component arranged to estimate a fragment count for a display of at least one three-dimensional, 3D, object; the hardware processing component being arranged to:
determine an ellipsoid representative of a set of vertices defined by coordinates of the at least one 3D object;
apply a transformation to the ellipsoid;
calculate a projection area of the transformed ellipsoid;
estimate the fragment count for the display of the 3D object based at least partly on the calculated projection area of the transformed ellipsoid prior to a runtime display of the 3D object; and estimate a time fragment shader length for the display of the 3D object based at least partly on the calculated projection area of the transformed ellipsoid prior to the runtime display of the 3D object, wherein estimating the time fragment shader length is performed after estimating the fragment count, wherein the time fragment shader length is a length of time to process instructions associated with a filling and shading stage.

9. The signal processing component of claim 8, wherein the signal processing component is implemented in an information display system.

10. The signal processing component of claim 9, wherein the information display system comprises an automotive driver information display system.

11. The signal processing component of claim 8, wherein the ellipsoid representative of a set of vertices defined by coordinates of the at least one 3D object comprises at least one of: an inertia ellipsoid; a best-fit ellipsoid; and a bounding ellipsoid.

12. The signal processing component of claim 8 further arranged to determine a sphere representative of the set of vertices.

13. The signal processing component of claim 8, wherein the fragment count for the display of the 3D object is estimated based at least partly on the projection area of the transformed ellipsoid multiplied by a coefficient value.

14. The signal processing component of claim 13, wherein the coefficient value comprises a predefined coefficient value.

15. The signal processing component of claim 13, wherein the coefficient value comprises a value derived at least partly from at least one of measured fragment count data and previous fragment count estimate data for at least one previously displayed object.

16. The signal processing component of claim 8 further arranged to calculate a runtime duration estimate for at least a part of a command sequence for a graphics processing unit, GPU including estimating a fragment count for a display of the at least one three-dimensional, 3D, object.

17. A non-transitory computer program product having executable program code stored therein for estimating, in a hardware processing components, a fragment count and a time fragment shader length for a display of at least one three-dimensional, 3D, object, the program code operable for:
determining an ellipsoid representative of a set of vertices defined by coordinates of the at least one 3D object;
applying a transformation to the ellipsoid;
calculating a projection area of the transformed ellipsoid; and
estimating the fragment count for the display of the 3D object based at least partly on the calculated projection area of the transformed ellipsoid prior to a runtime display of the 3D object; and
estimating the time fragment shader length for the display of the 3D object based at least partly on the calculated projection area of the transformed ellipsoid prior to the runtime display of the 3D object, wherein estimating the time fragment shader length is performed after estimating the fragment count, wherein the time fragment shader length is a length of time to process instructions associated with a filling and shading stage.

18. The non-transitory computer program product of claim 17 wherein the ellipsoid representative of a set of vertices defined by coordinates of the at least one 3D object comprises at least one of:
an inertia ellipsoid;
a best-fit ellipsoid; and
a bounding ellipsoid.

19. The non-transitory computer program product of claim 17 wherein the fragment count for the display of the 3D object is estimated based at least partly on the projection area of the transformed ellipsoid multiplied by a coefficient value.

20. The non-transitory computer program product of claim 19 wherein the coefficient value comprises a value derived at least partly from at least one of measured fragment count data and previous fragment count estimate data for at least one previously displayed object.

* * * * *